Figure 1:
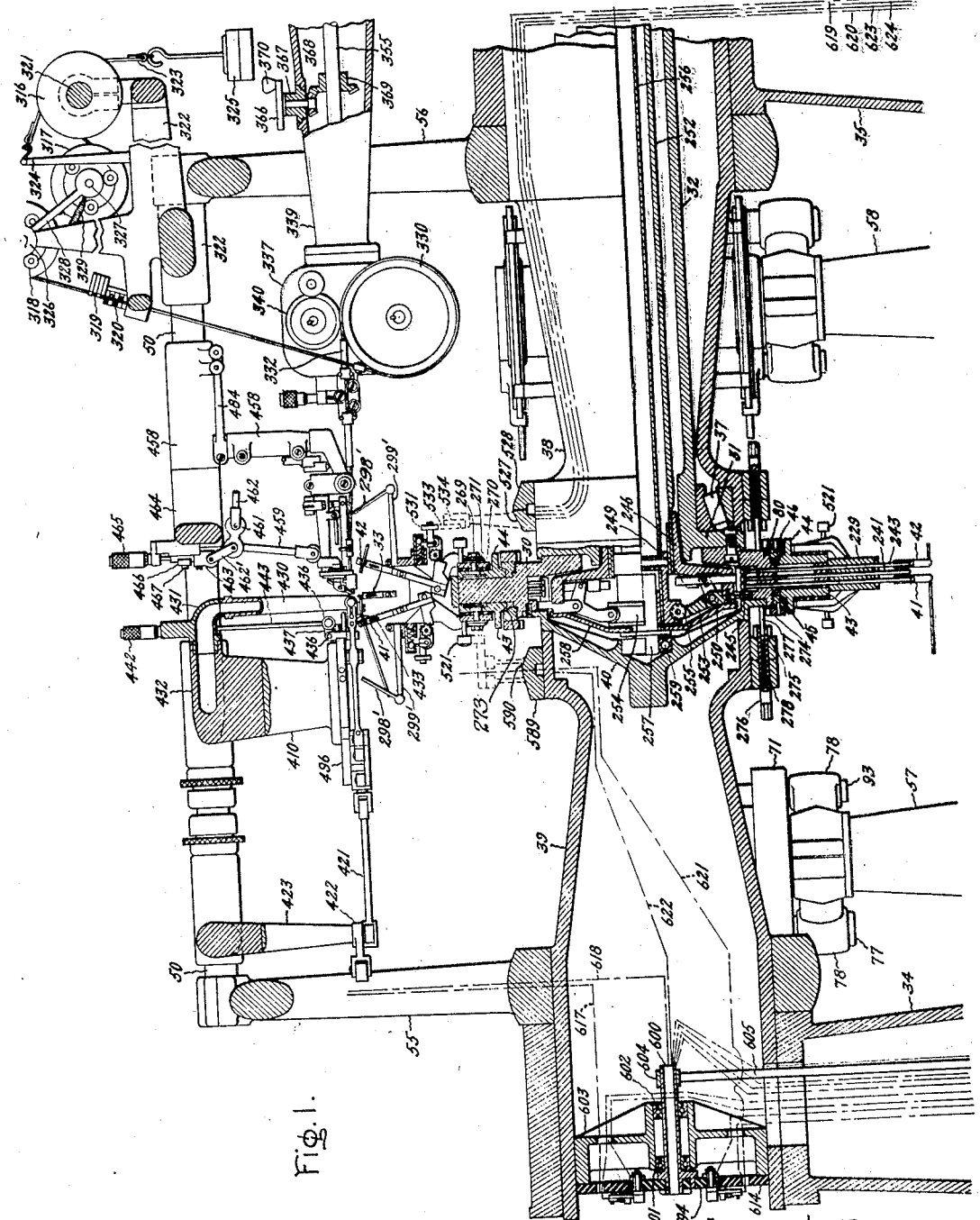

Inventor:
Cleveland H. Quackenbush,
by Harry E. Dunham
His Attorney.

Nov. 15, 1938.  C. H. QUACKENBUSH  2,137,181
WELDING MACHINE
Filed Feb. 14, 1935  9 Sheets-Sheet 2

Inventor:
Cleveland H. Quackenbush.
by Harry E. Dunham
His Attorney.

Nov. 15, 1938.  C. H. QUACKENBUSH  2,137,181
WELDING MACHINE
Filed Feb. 14, 1935  9 Sheets-Sheet 3
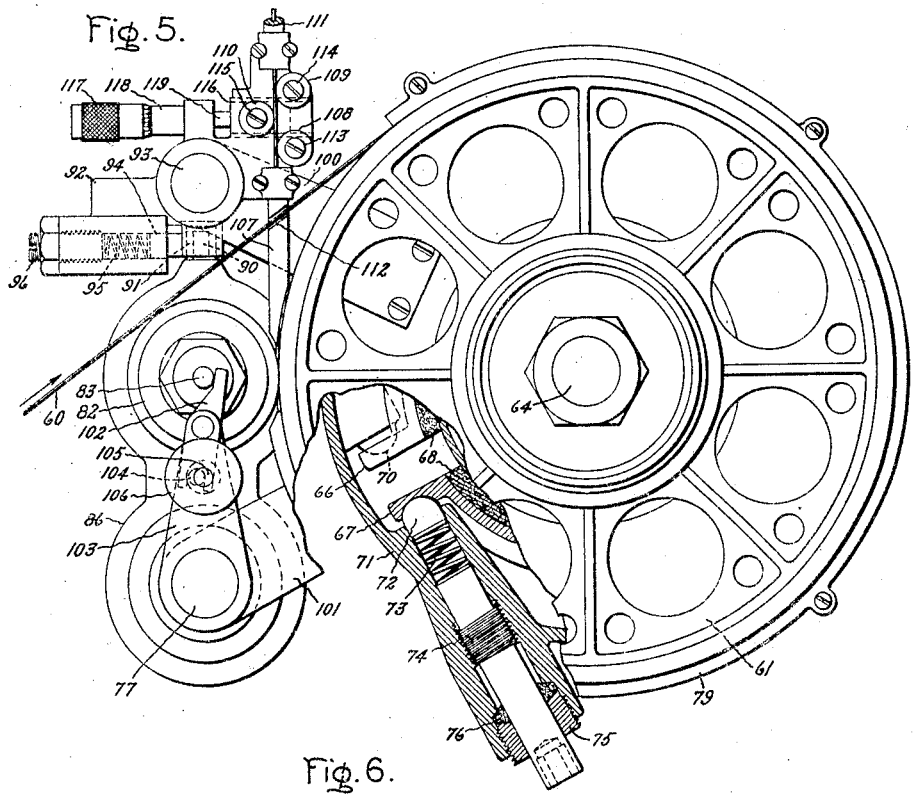
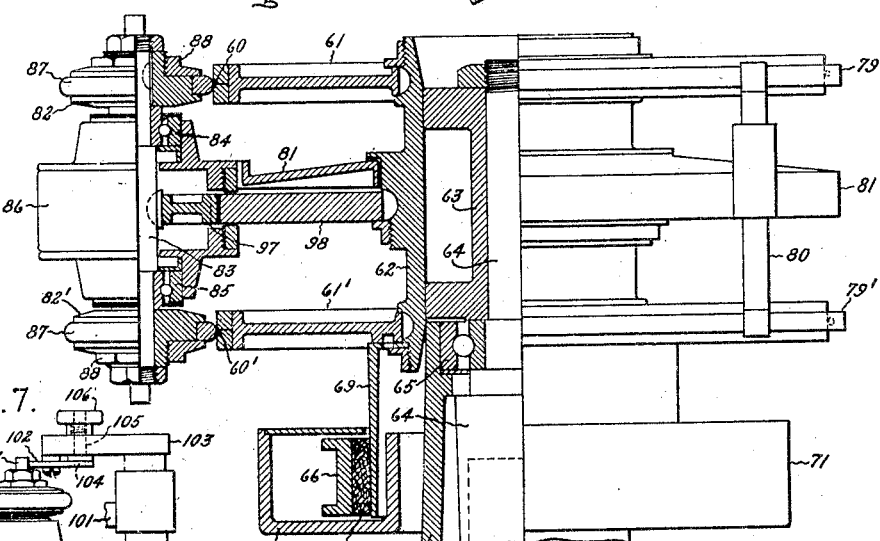
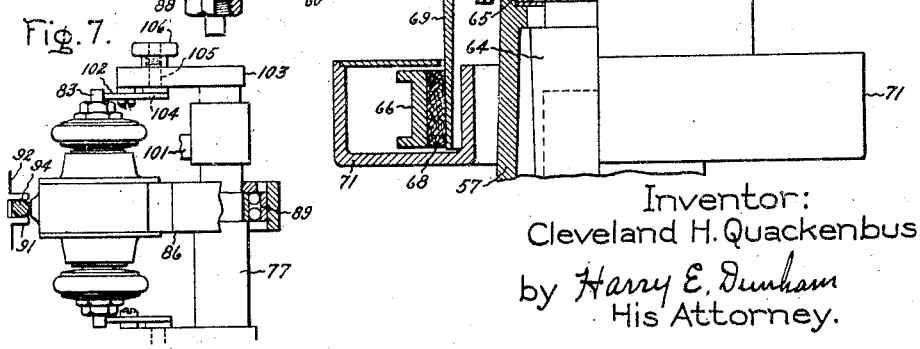
Inventor:
Cleveland H. Quackenbush,
by Harry E. Dunham
His Attorney.

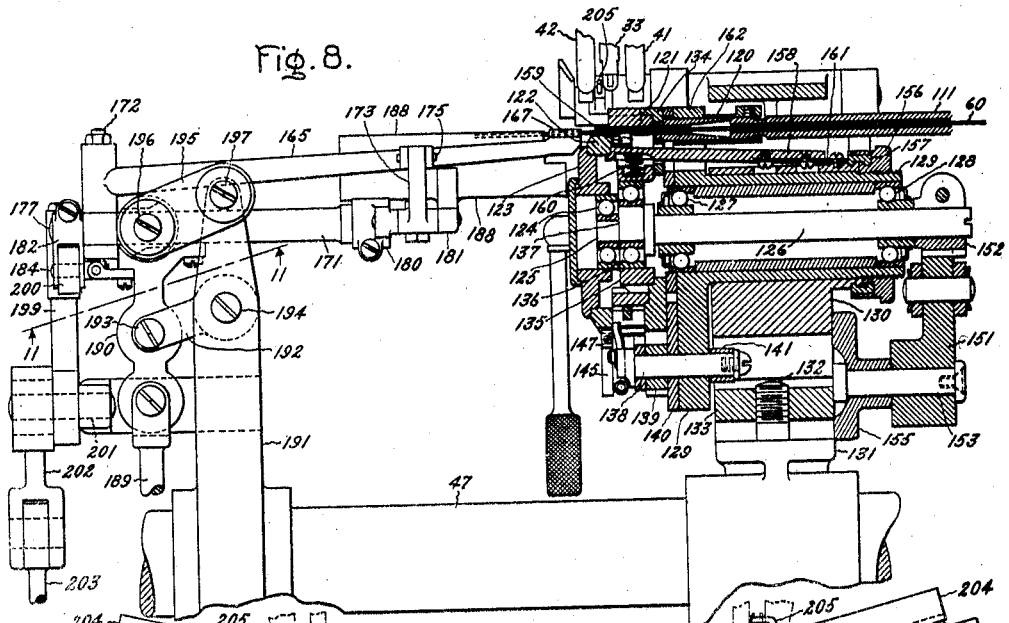
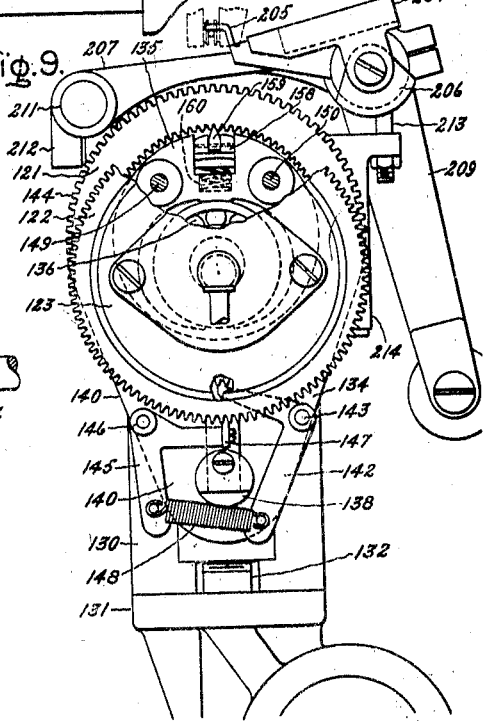
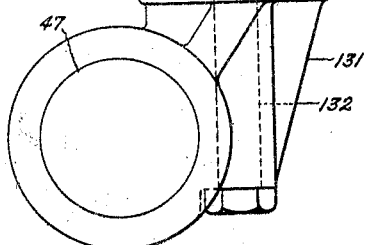

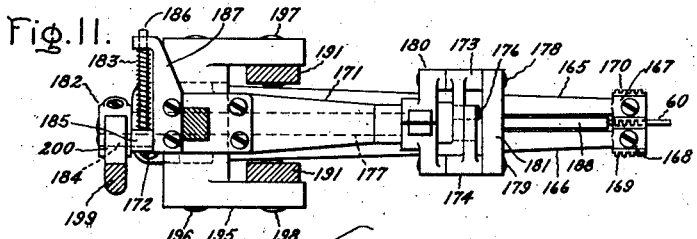

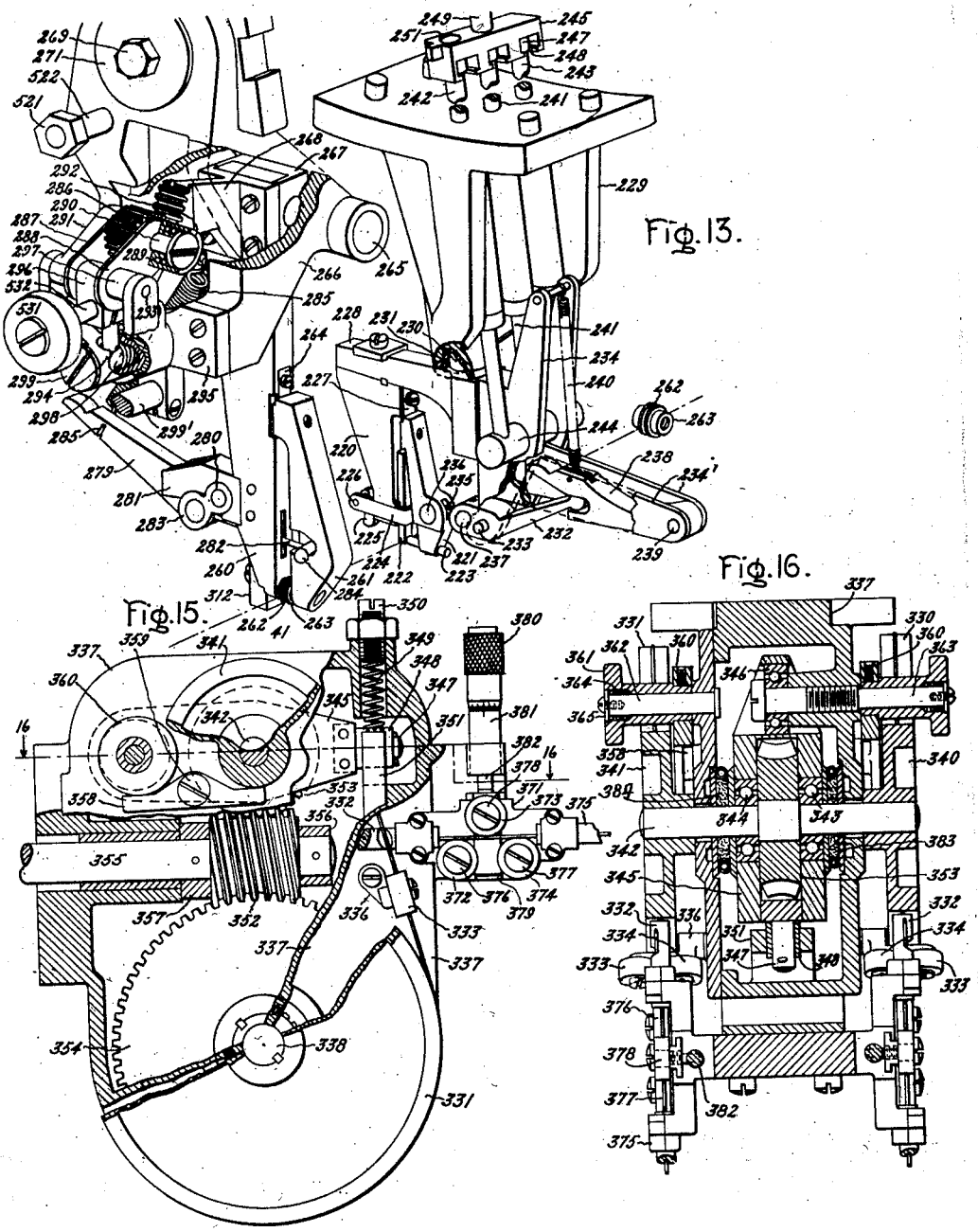

Nov. 15, 1938.   C. H. QUACKENBUSH   2,137,181
WELDING MACHINE
Filed Feb. 14, 1935   9 Sheets-Sheet 7
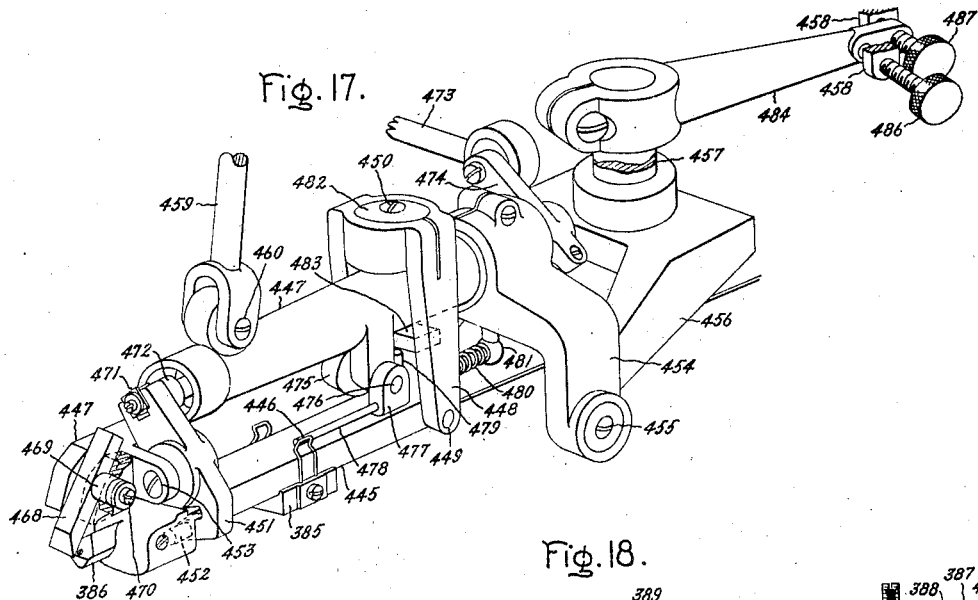
Fig. 17.
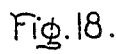
Fig. 18.
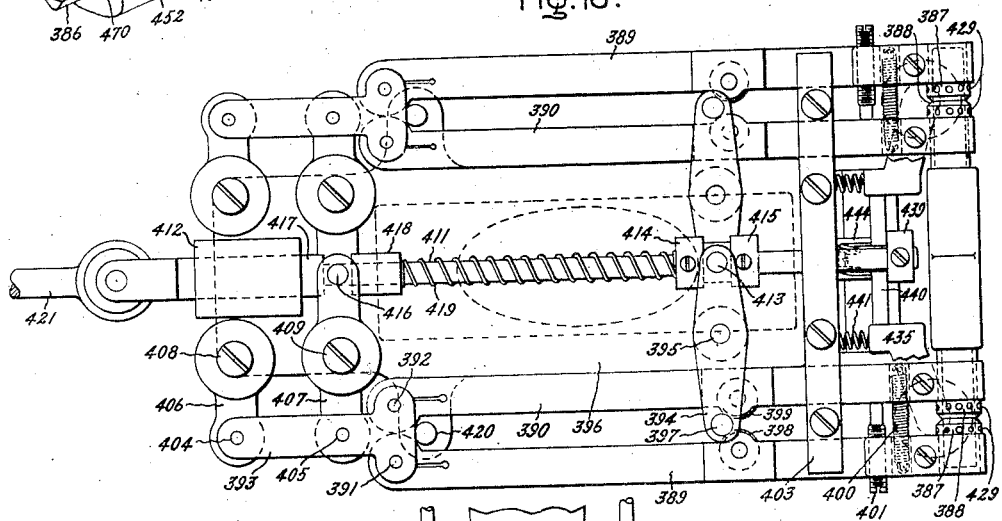
Fig. 19.
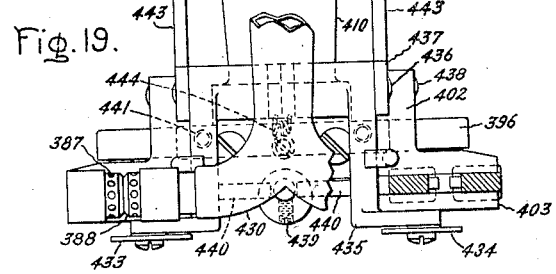
Inventor:
Cleveland H. Quackenbush,
by Harry E. Dunham
His Attorney.

Nov. 15, 1938.  C. H. QUACKENBUSH  2,137,181
WELDING MACHINE
Filed Feb. 14, 1935   9 Sheets-Sheet 8
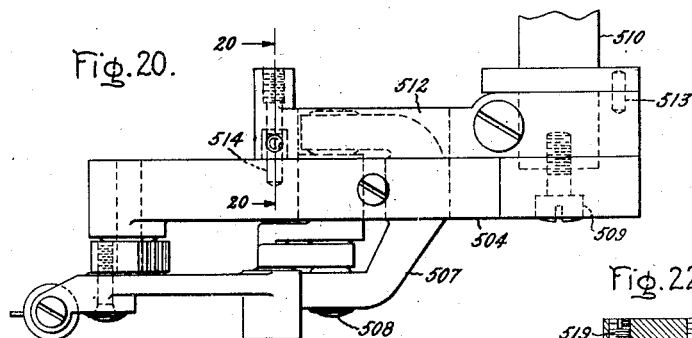
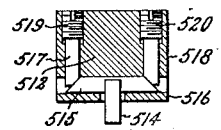
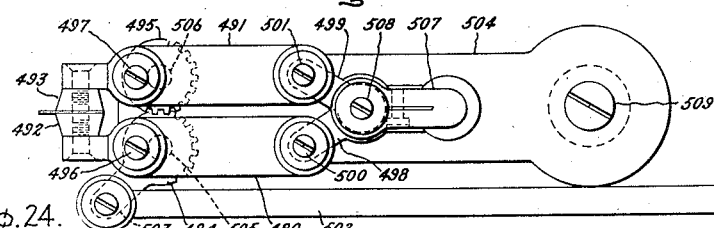
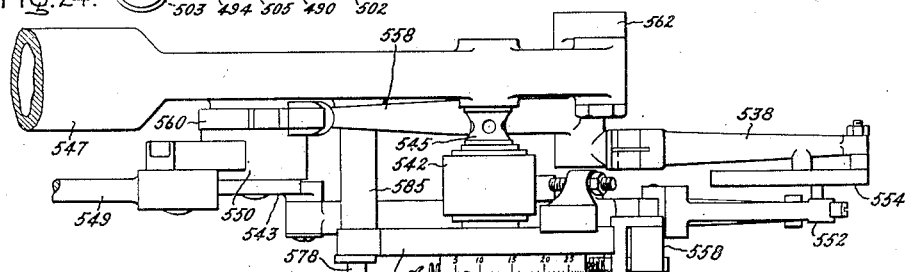
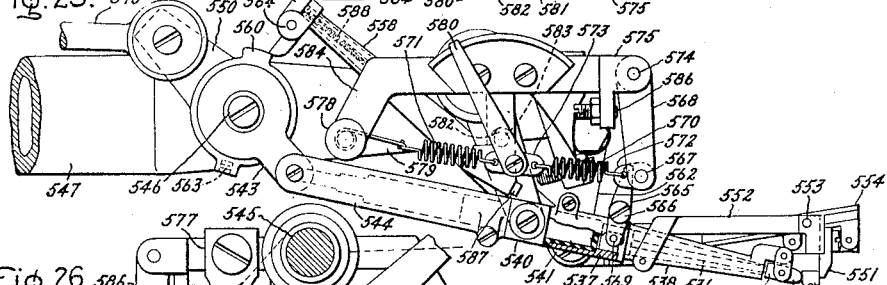
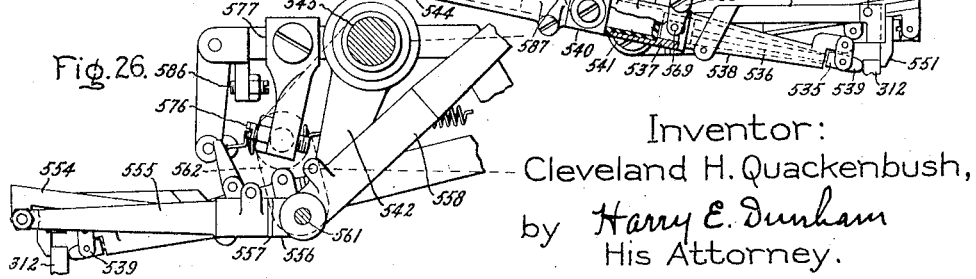
Inventor:
Cleveland H. Quackenbush,
by Harry E. Dunham
His Attorney.

Nov. 15, 1938.  C. H. QUACKENBUSH  2,137,181
WELDING MACHINE
Filed Feb. 14, 1935   9 Sheets-Sheet 9

WELDING POSITIONS

Inventor:
Cleveland H. Quackenbush,
by Harry E. Dunham
His Attorney.

Patented Nov. 15, 1938

2,137,181

UNITED STATES PATENT OFFICE 2,137,181

WELDING MACHINE

Cleveland H. Quackenbush, Glendale, Calif., assignor to General Electric Company, a corporation of New York Application February 14, 1935, Serial No. 6,509

16 Claims. (Cl. 219—4)

My invention relates to the welding of wires together in end to end relation and more particularly to machines for automatically performing this operation at a high rate of speed. In the manufacture of incandescent lamps, radio tubes and the like, wires of sections of different composition are customarily used so that the wire will function properly in the part of the article in which it is located. Wires of this type are required to be straight and the welds therein must be of good strength, not brittle and not have excessive "knots" or "flash" thereabout. The number and composition of sections of each wire varies considerably although a three part wire of copper, a special composite seal wire and nickel is most generally used. In this instance the three-part wire is used, since the special seal wire is much higher in cost than the other sections, making its use desired in the interests of economy. These wires are generally termed leading-in wires.

One object of my invention is to provide a method of manipulating the various sections or wires in manufacturing the leading-in wire which permits changing the length of the end sections as desired without requiring adjustment of other parts of the machine to make it correspond therewith. Another object of my invention is to provide a method of making electrical contact to a section of the leading-in wire, usually the middle section in the case of a three part leading-in wire. Difficulty is experienced in making the contact as the special seal wire customarily used for this part is coated with an insulating material which keeps the wire from oxidizing or otherwise weathering before and during manufacture and which is absorbed by the glass parts of the finished article.

Another object of my invention is to provide an automatic machine for making a wire of a plurality of sections of such quality as to be suitable for use as leading-in wires in electric lamps and the like.

Another object of my invention is to provide a turret type machine turning about a horizontal axis for making the sectional wire. Still another object of my invention is to provide mechanism for giving a definite and adjustable pressure of contact between sections of wire being welded.

In a general way, the operation of my machine consists in feeding lengths of wire representative of the end sections of the leading-in wire to be made into pairs of jaws a short distance apart but in alignment with each other. Between these pairs of jaws lies a third pair of jaws which combined with the other jaws form a head of the machine. There are twenty-four such heads on a turret mounted on a horizontal axis which is indexed intermittently. The heads are operated in pairs, each head of which carries the wire through like operations and is operated on in a like manner. The lengths of wire fed into the outer sets of jaws are each taken from a continuous strand unwound from a spool and are transferred to the jaws of the turret head after having been cut therefrom. Separate spools of wire are provided for each of the four wires fed into the outer jaws and the wire as drawn from the spool passes through a straightener, around a feeding sheave through another straightener and then to the cutting knives. A roller is mounted adjacent the sheave which turns at a greater peripheral speed than the sheave and therefore keeps the wire drawn tightly thereabout. A very positive feed is provided since the sheave is turned to feed the wire and said wire cannot slit thereon. The cutting knives comprise oppositely disposed V slots and the wire passes through the aperture formed thereby to the jaws of a transferring means located therebeyond. The knives close on each other after the transfer jaws have gripped the wire and cut the wire cleanly without leaving a burr. The transfer mechanism carries the length of wire into the turret jaws in such a manner as to leave the end severed from the continuous strand facing the middle jaw of the turret head. This feature permits changing the length of wire fed as desired without changing anything but the free end of the wire which is not operated on in any way and eliminates any necessity of adjusting the cutting and transfer mechanisms to compensate therefor.

The outer jaws carrying the end sections of the leading-in wire are now swung away from the middle jaw thereby providing clearance for the mechanism feeding thereto. In this instance feeding sheaves and straighteners similar to those used with the other wires are used but the wire is fed into a tubular member which carries the end thereof advanced beyond said member by said feeding motion between knives of scraping mechanism located adjacent thereto. The scraping mechanism consists of a pair of coacting knives which close on each other until in contact with the sides of the wire located therebetween at a point a very short distance from the free end thereof. The knives are then pulled off the end of the wire leaving small areas on opposite sides thereof adjacent to the end scraped clean. This operation is required as a coating, usually of borax, which keeps the wire from oxidizing and which is not conductive, covers the wire so that it has to be removed before electrical contact can be made thereto. After being scraped the tubular member is carried toward the turret, placing the wire projecting therefrom into the center jaws of the turret head. The tubular member then moves sidewise across the face of a knife located adjacent to the wire causing it to cut the section thereof held by the head jaws from the remainder.

The welding operations are the next to be performed and occur in two parts. The first welding operation occurs as one end wire section is welded to the middle section and is produced after each section is connected to separate leads from a bank of charged condensers. Connection is made to the middle wire section through a pair of jaws which close on the end of the wire so as to engage the previously cleaned portions thereon. Connection to the end wire section is made through the jaws in which the wire is held since a portion thereof contacts through rotation of the turret with a stationary brush connected to said condenser. The weld is made as the outer jaws are swung toward the center pair and as the ends of the wire are brought in contact by this movement. The movement is brought about by mechanism pushing the outer jaws which bring the wires together with a specific pressure. The second welding operation consists in the welding of the other end wire section to the free end of the middle section and takes place as the ends of the wires are brought in contact. In this instance both pairs of outer jaws are connected to a charged bank of condensers through contact with stationary brushes and the free pair of outer jaws are swung by duplicate mechanism to that previously described. All sets of jaws of the turret head now open permitting the finished leading-in wire to fall out which completes the operation cycle of the machine.

Now in a specific way referring directly to the embodiment of my invention shown in the drawings, the drawings show only the mechanism associated directly with the manufacture of the wire and is essentially comprised of the wire feeding units, the turret and all mechanism operating in connection therewith. The remaining portions of the machine comprising supporting structure, turret indexing mechanism and operating mechanism, the latter operating members both longitudinally and radially, are not shown as they are well known in the machine art. The mechanism herein described is located about the turret which is mounted on a horizontal axis on a table. The operating mechanism (not shown) lies within a table below the turret and in a housing at one end of the turret on the upper surface of the table. Wherever possible ball bearings are used on turning shafts and other mechanism and reference will not be necessarily made to them unless they function in some particular manner.

Figure 2:
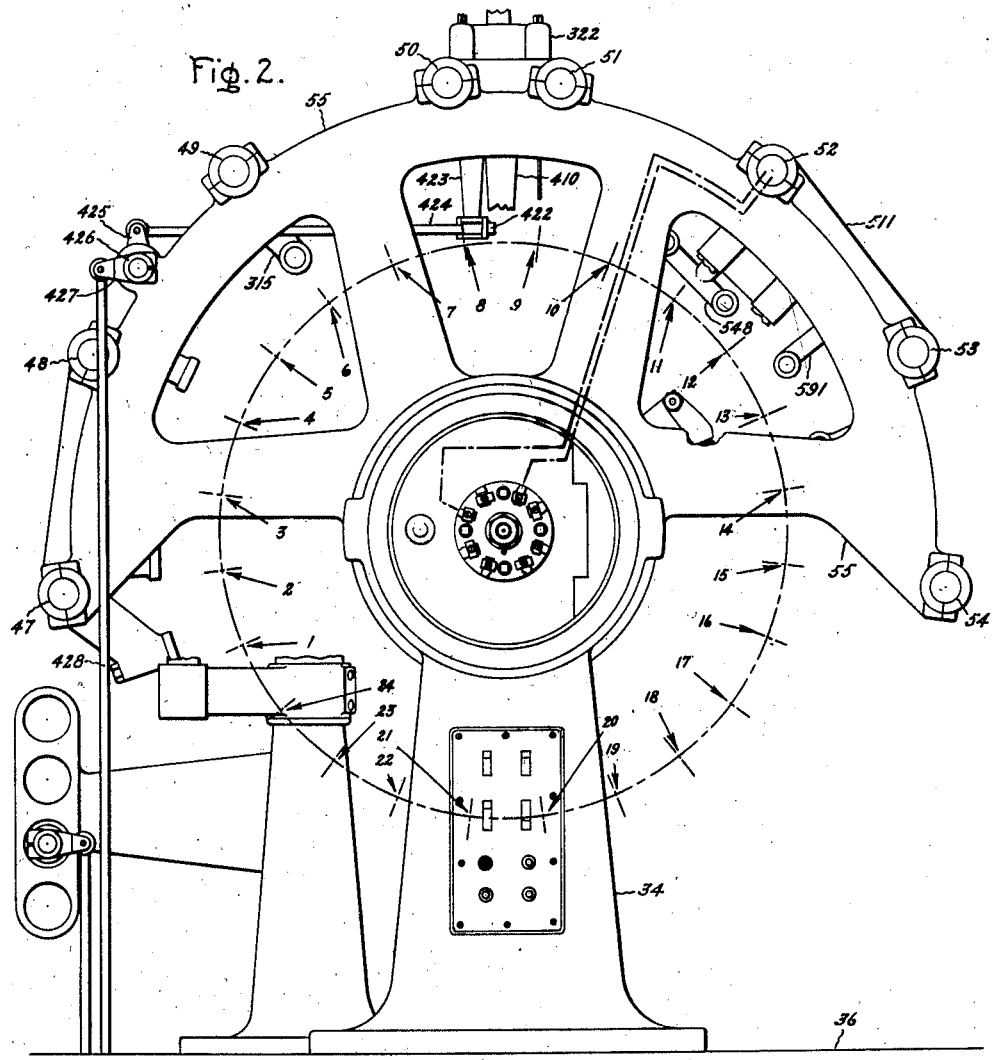
Figures 3, 4:
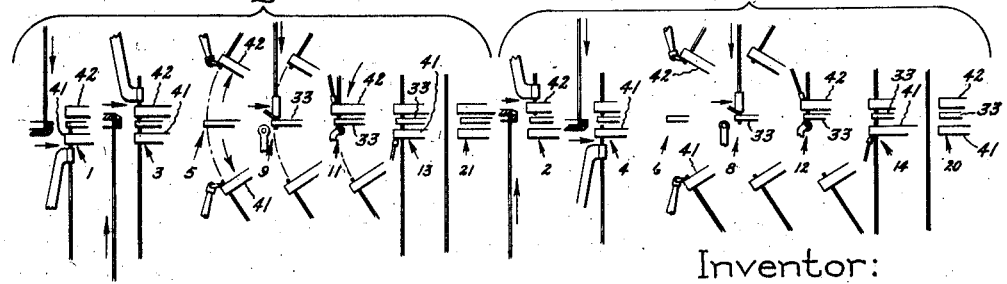
Figure 27:
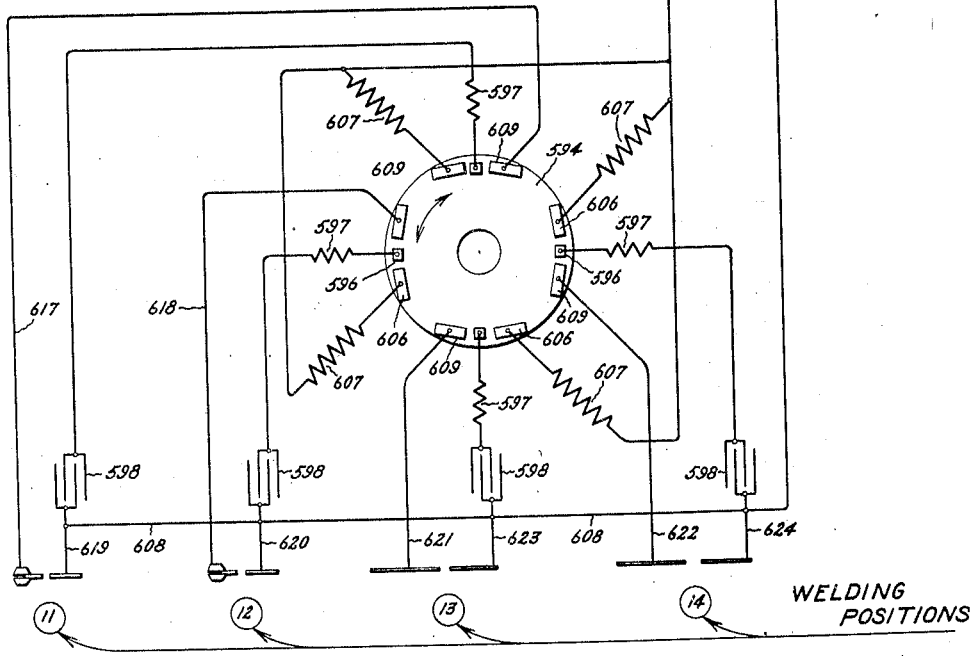
Figure 28:
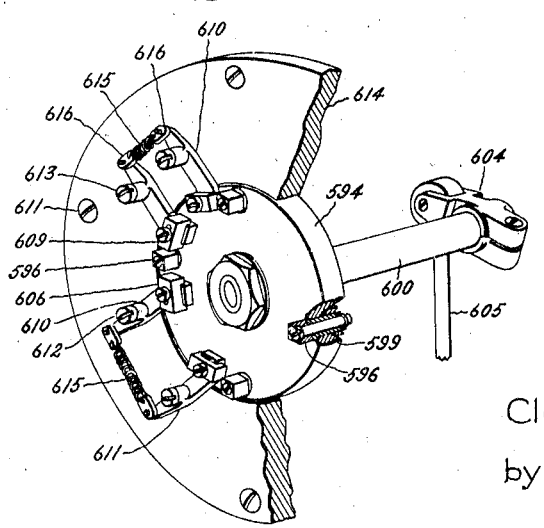
Figure 23:
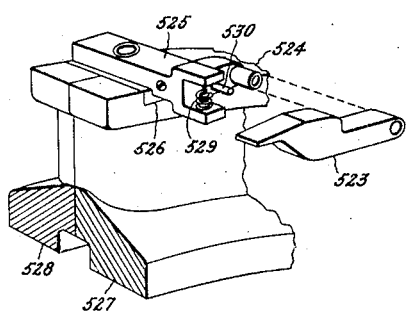

Now referring directly to the drawings, Fig. 1 is a vertical section through the turret along the axis thereof showing also associated mechanisms mounted thereabout; Fig. 2 is an end view thereof with the positions of the heads of the turret and the other mechanisms indicated; Figs. 3 and 4 are schematic views showing progressively the operation steps occurring to each of the paired heads of the turret; Figs. 5 and 6 are top and side views respectively of the wire feeding mechanism, supplying one end section of the leading-in wire to each of the paired heads; Fig. 7 is a side view of the wire tightening rolls thereof; Fig. 8 is a plan view of the wire transferring mechanism and a section through the wire cutting mechanism provided for each of the end sections of the leading-in wire; Figs. 9 and 10 are front and back views respectively of the wire cutting mechanism; Fig. 11 is a plan view partially in section of the transfer mechanism for an outer section of the leading-in wire with the section taken along lines 11—11 of Fig. 8; Fig. 12 is a perspective view of the wire locating means cooperating with the transfer mechanism; Fig. 13 is a perspective view of the middle and one outside pair of jaws of the turret head with the position of the other outside pair of jaws indicated; Fig. 14 is a perspective view of the jaw receding mechanism; Fig. 15 is a side view of the wire feeding mechanism supplying the wire for the center sections of both the leading-in wires made simultaneously; Fig. 16 is a section along lines 16—16 of Fig. 15; Fig. 17 is a perspective view of the transfer and cutting mechanism of each of said wires; Figs. 18 and 19 are bottom and front views respectively of the scraping mechanism of both of said wires; Figs. 20 and 21 are side and bottom views respectively of the contact making jaws of each of said wires; Fig. 22 is a section along line 22 of Fig. 20; Fig. 23 is a perspective view of a contact making brush for each of the outer turret jaws; Figs. 24 and 25 are side and top views of the outer turret jaw advancing mechanism; Fig. 26 is a side view of the opposite side of said mechanism; Fig. 27 is a wiring diagram of the welding circuit for the machine; and Fig. 28 is a perspective view of the condenser charge and discharge switch.

In detail my machine as shown in Figs. 1 and 2 provides a turret mounted on a horizontal axis comprising basically of ring 30 which is attached to the flanged portion 31 of hollow shaft 32 and which supports at twenty-four equidistantly spaced points about the periphery thereof pairs of jaws 33. As shown, the turret lies midway between standards 34 and 35 on upper surface of table 36 and is supported on bearing 37 in the end of housing 38 projecting from standard 35. Housing 39 extends from standard 34 to the cover plate 40 which is located over the opening in said turret. To either side of jaws 33 are located other pairs of jaws 41 and 42 which are mounted on rings 43 and 44 respectively clamped to the opposite faces of the turret by locking rings 45 and 46. Each set of three jaw pairs comprises a head of the machine which are indicated by Nos. 1 to 24 inclusive in Fig. 2 and in which the three separate sections of the leading-in wire manufactured in this instance are held. The mechanisms for feeding said wires into the jaws and for causing the welding are located about the turret at various positions through which the wires are progressively moved by intermittent indexing thereof.

When mechanisms are located some distance away from the table 36 the mechanisms are mounted on rods 47 to 54 inclusive which extend between spiders 55 and 56 on housings 39 and 38 respectively. The turret is turned through mechanism (not shown) operating through shaft 32 which indexes the turret in 30° steps so that heads are advanced two positions at a time. In this way one head takes twelve positions about the turret in one rotation and the head adjacent to it takes twelve different positions adjacent thereto. To distinguish from each of these series of heads, the said heads are referred to as the odd and even heads according to the number given them in Fig. 2. Although each series of heads are operated on in a like manner, the order of the operations is different for each series as shown in Figs. 3 and 4, the former referring to the odd series and the latter to the even series.

At positions 1, 2, 3 and 4, wires representative of the end sections of the leading-in wire are not alike since the wire manufactured and followed by this description has end sections of copper and nickel and is of different length. The copper wire is fed in at positions 1 and 4 and the nickel wire which is somewhat shorter, is fed in at positions 2 and 3. Similar feeding mechanism is provided for both the nickel and copper wires, the nickel wire feeding mechanism is located on standard 57 whereas the copper wire feeding mechanism is located on standard 58. The latter mechanism is a duplication of the former except that its two wire feeding sections are separated some distance so it feeds in positions 1 and 4.

The nickel wire is supplied on two spools (not shown) and passes therefrom to guide wheels which direct it to a wire straightener also not shown. On leaving the straightener it passes into the feeding mechanism shown in Figs. 5, 6 and 7. Here the nickel wires are indicated as 60 and 60' and pass into the peripheral groove of sheaves 61 and 61' respectively. The sheaves are each keyed to sleeve 62 which is mounted on hub 63 in turn mounted on shaft 64. The shaft lies within standard 57 and is turned intermittently by mechanism (not shown) engaging the lower end thereof which comprises mechanism with adjustable leverage so the desired amount of turning takes place. Bearing 65 is interposed between standard 57 and shaft 64. To prevent over-running, a brake is employed comprising the pivotally connected shoes 66 and 67 having facings 68 which engage drum 69 extending from sheave 61'. The free end of shoe 66 engages the ball point 70 in housing 71 whereas the free end of shoe 67 engages slug 72 in a passage in the housing which is backed by spring 73 and screw 74. Sleeve 75 screws into the housing and forces washer 76 against the screw 74 preventing it from turning. The housing is supported through an arm (not shown) which engages the post 77 (Fig. 1) extending from the bracket 78 clamped to standard 57. The wires while on the sheaves are confined within grooves of guide rings 79 and 79' which are mounted on rods 80 extending from guard 81. Before the wires leave the periphery of the sheaves, they pass below rolls 82 and 82' on opposite ends of jack shaft 83 which is mounted in bearings 84 and 85 in bracket 86. The rolls engage the wire through removable rims 87 which are clamped thereto by the flanged nuts 88. As shown in Fig. 7, bracket 86 is supported by ball bearing 89 on post 77 and by pin 90 which engages block 91 in horizontal ways in bracket 92. The ball bearing is of the self-aligning type and permits the bracket to tilt so that the rolls 82 and 82' engage the wires with equal pressure. Bracket 92 is mounted on post 93 extending from bracket 78 (Fig. 1) and supports mechanism for forcing the roller into engagement with the wire comprising the stud 94 of block 91, spring 95 and screw 96 which are located in a passage in said bracket 92. The rolls are driven members traveling at a slightly higher peripheral speed than the sheaves thereby causing the wire to be drawn tightly about the sheaves and to be advanced very positively therewith. The rolls are driven through gear 97 on jack shaft 83 which meshes with gear 98 attached to sleeve 62 and in this particular instance have a peripheral ratio with the sheaves of 4 to 1 whereas the ratio of the gears is 4.1016 to 1. Guard 81 covers gear 98 and is supported by arm 100 of bracket 92 and another arm 101 partially shown engaging post 77. The rolls may be pulled back from the wire so as to facilitate threading the machine by similar mechanism mounted adjacent each roll comprising lever 102 pivotally on arm 103 and turned by pin 104. The levers 102 engage the end of the jack shaft 83 and are moved as pin 105 on which pin 104 is eccentrically mounted is turned through thumb nut 106. Arms 103 are mounted on post 77. Each of the nickel wires passing from the sheaves passes through tube 107, between rollers 108, 109, and 110 which takes out the curvature produced in feeding and passes into the tube 111. Both tubes 107 and 111 are mounted on bracket 92 and the former is cut away at 112 to give clearance to the incoming wire crossing at this point. Rollers 108 and 109 are mounted on screws 113 and 114 in bracket 92 whereas roller 110 is mounted on screw 115 in slide 116 located in ways in said bracket. The position of roller 110 is adjusted by turning the barrel 117 of the micrometer 118 held by bracket 92 which causes the plunger 119 lying against the slide to move it in or out.

Both nickel and copper pairs of wires are advanced by their feeding mechanisms through separate cutting mechanisms and transferring mechanisms shown in Fig. 8. These mechanisms are mounted on rods 47 and 48 (Fig. 2) just beyond the turret head into which the wire is to be placed and advance the free end of the wire away from the pair of jaws into which it is to be located. In this way the loose end extends away from the other mechanism and can be of any length desired. The wire passes from the end of tube 111, through the guide tube 120, the notches of die member 121, the notches of die member 122 to the jaws of the transfer mechanism therebeyond. The cutting mechanism is shown in Figs. 8, 9, and 10 and comprises a ring-shaped die member 121 having notches across the inner edge and a circular shaped die member 122 having notches across the outer edge. As the wire is fed beyond the cutting edges of the die members, the particular notches of each through which the wire passes are aligned. The notches are V in shape with a radius at the base thereof preferably slightly less than that of the wire which causes the cut to occur at right angles thereto and not to leave a burr. These features are essential to prevent uneven welds and excessive flash or loose metal about the weld. Die member 122 is mounted on hub 123 which rides on ball bearing 124 on a concentric part 125 of shaft 126 and the shaft 126 is mounted on ball bearings 127 and 128 in carriage 129. The carriage lies in an aperture in block 130 which is attached to bracket 131 extending from rod 47 by the bolt 132 of said bracket which screws into block 133 located in an aperture in block 130. Die member 121 is mounted on plate 134 which is fastened by screws (not shown) to a cylindrical hub 135, having an eccentric hole therein in which ball bearing 136 is located. The bearing rides on an eccentric portion 137 of shaft 126. The device operates as die member 121 is moved toward a concentric position by the partial rotation of shaft 126 which moves the notches in which the wire is located over the solid portion of the die members. The rotation of shaft 126 causes the assembly comprising hub 135 and plate 134 to move radially since it is prevented from turning by the pin 138 mounted in carriage 129 which engages ways in said plate through block 139. A thrust washer 140 lies between the plate 134 and the carriage 129. A block 141 on the other end of pin 138 engages an aperture in block 130 keeping the carriage from turning. Rotation of die member 121 is prevented by lever 142 which is mounted on pin 143 in plate 134 and engages one of a series of notches 144 cut in the outer periphery of the die member. Die member 122 is prevented from turning by lever 145 which is mounted on pin 146 in thrust washer 140 and engages the notches in the outer periphery thereof through dog 147. Spring 148 extends between ends of the levers 142 and 145 and keeps them in contact with the die members. Hub 123 which supports die memebr 122 is retained by screws 149 and 150 only partially shown which extend from carriage 129 through thrust washer 140 and large holes in plate 134 and hub 135 giving the proper clearance. Shaft 126 is turned by gear segment 151 which engages gear segment 152 thereon and is operated about pin 153 by rod 154. The rod is actuated at the proper time intervals indirectly by suitable cam operated mechanism (not shown). Pin 153 is attached to block 130 by bracket 155. Should the particular notches being used become dull, other notches in the die members may be advanced into position by turning said die members after pulling levers 142 and 145 from engagement therewith. The position of the die members can be adjusted so the end of the wire being cut will fall in the desired location after it has been transferred by movement of carriage 129 in block 130. The adjustment is brought about by turning collar 156 which is screwed on threads of the carriage and is held against the face of block 130 by band 157 which engages grooves in each. The wire 60 once having been severed would be apt to move out of proper alignment with die member 121 except for finger 158 (Figs. 8 and 9) which holds the wire therein. The finger engages the wire through a shoe 159 pivotally mounted therein and is forced thereagainst by the spring 160 located between it and hub 135. The finger is fastened to block 130 by flat spring 161 and, like block 162 which supports the guide tube 120 and an end of tube 111, is free to move as required in cutaway portions of the carriage 129 and thrust washer 140. A flexible portion of tube 111 (not shown) gives it freedom of movement.

Each wire transfer mechanism, as shown in Figs. 8 and 11, consists of a pair of jaws 165 and 166 which engage the wire and transfer it to an outer set of jaws of the turret head, in the instance shown jaw 42. The mechanism is so located with respect to the jaws that the end of the wire just severed is placed adjacent the center turret jaws 33. The transfer jaws engage the wire through blocks 167 and 168 mounted thereon, one of which has teeth 169 along either edge which form a V and which enter into cutaway portions 170 of the other. The jaws are pivotally attached to carriage 171 by pins 172 and are closed by levers 173 and 174 which are attached thereto through pins 175 and which are operated by engagement with an offset pin 176 in shaft 177. The levers are supported on pins 178 and 179 extending between a bracket 180 attached to an end of the carriage 171 and plate 181. The closing movement occurs as shaft 177 is turned by arm 182 which is actuated by spring 183 through pin 184 and block 185 thereon. The spring 183 is located about pin 186 of block 185 which slides in bracket 187. The wire 60 lies in the opening of a V-shaped guard 188 mounted on plate 181. After the wire has been gripped and severed, the transfer jaw assembly is moved so said wire is carried between the open pair of turret jaws 42 to a position governed by the mechanism shown located adjacent to the jaws. The transferring movement results from longitudinal motion of rod 189 which engages the bracket 190 fastened to carriage 171 and is operated by mechanism (not shown). The carriage 171 is supported by the arm 191 extending from rod 47 through arm 192 which is pivotally attached to bracket 190 by screw 193 and to arm 192 by screw 194 and through yoke 195 which is pivotally attached to the carriage by screw 196 and to arm 192 by screws 197 and 198. The connecting portion of yoke 195 is apertured so as to pass around the carriage and not to interfere with its movement. After the wire 60 has been gripped by the turret jaws, the jaws of the transfer mechanism are opened by engagement of arm 199 with the roller 200 of arm 182. Arm 199 is turned about pin 201 in a section of arm 191 by arm 202 which is clamped onto a hub portion of arm 199 and which is actuated by mechanism (not shown) through rod 203. The transfer mechanism is returned to its former position by a reverse movement of the mechanism previously described.

In order that the wire 60 be placed in the turret jaws so it will line up with the wires held by the other jaws, the mechanism shown in Figs. 8, 9, 10, and 12 is used in cooperation with the transfer mechanism to govern the position said wire takes on being transferred. This mechanism consists of cam 204 and finger 205 which take positions on either side of the turret jaw into which the wire is fed. Cam 204 is essentially a safety measure for moving the jaws to their correct position adjacent to the center jaws as the turret indexes them into this position should they be located too far to the outside. The cam is mounted on the U-shaped bracket 206 which is clamped to arm 207. The finger 205 engages the end of the wire 60 protruding beyond the inner edge of the jaws as it is transferred thereinto and limits the extent the wire passes into the jaws. The finger 205 is mounted on shaft 208 in arm 207 and after the turret jaws have closed on the wire, the said finger 205 is drawn away therefrom so as not to interfere therewith as the turret jaws move away. Movement of finger 205 is produced by turning of shaft 208 by arm 209 which is operated through rod 210 from mechanism (not shown). The arm 207 is pivotally attached to pin 211 in bracket 212 extending from block 130 and is turned about said pin to change the position of the finger by adjustment of screw 213. Screw 213 is threaded into bracket 214 which is attached to block 130 and has an aperture therein in which a spring 215 is located. The spring pulls arm 207 against screw 213 and extends between an aperture in arm 207 and a cap 216 over the aperture in bracket 214.

The turret heads each comprise two outside pairs of jaws 41 and 42 similarly constructed and a middle pair of jaws 33 dissimilar to the others. The middle pair of jaws 33 is shown in Fig. 13 with a one outside pair of jaws 41 shown in full and the other outside pair of jaws 42 indicated. For clearness the pairs are separated farther than they actually are on the turret. The middle pair of jaws comprises a stationary jaw 220 and a movable jaw 221 having metal wear-resisting bodies 222 and 223 respectively, preferably of a cemented tungsten carbide alloy such as "Carboloy" for engaging the wire. Body 222 is preferably grooved slightly so the wire is more firmly held and is clamped to the jaw by yoke 224. The yoke is drawn tight by the wedge 225 located between the pin 226 connecting the legs of the yoke and the jaw 220. Body 223 is located in an aperture in jaw 221 in which it is held by a wedge (not shown). The movable jaw 221 is mounted on the stationary jaw 220 through a strip 227 of metal spring and jaw 220 is clamped to the bracket 228 extending from standard 229. The flexibility of strip 227 allows jaw 221 to twist slightly so that proper engagement with the wire occurs at all times. Bracket 228 is held by a stud 230 thereof which extends into an aperture in the standard and is insulated therefrom by sleeve 231. Operation of jaw 221 is effected through a toggle mechanism comprising lever 232 pivotally mounted on pin 233 in bracket 234 and link 235 pivotally connected to said jaw and lever by pins 236 and 237 respectively. The lever 232 is actuated by lever 238 which turns about pin 239 in the extending arms 234' of bracket 234 and engages the rounded end of lever 232. The jaws are closed by spring 240 which extends between pins in bracket 234 and lever 238 and are opened by push rod 241 which moves longitudinally in standard 229 and strikes the end of lever 238. The push rod 241, as shown in Figs. 1 and 13, corresponds to two others, 242 and 243, which operate the outer turret jaws of the preceding head and lie in apertures in turret 30, standard 229 and guide rod 244. The guide rod 244 is an insulating member insulating the push rods from bracket 234 and is made preferably of "Bakelite." The bracket 234 is mounted on bracket 228 and standard 229 is mounted on turret 30. Since the push rods do not touch the jaw operating mechanism except when opening the jaws, said jaws are completely insulated from the rest of the machine during the welding operation which takes place while the wire is securely gripped by the jaws.

Control of the jaw opening, as shown in Fig. 1, lies in a series of twenty-four blocks 245 located on the inner stationary disc 246 at positions taken by push rods 241, 242, and 243 at each rest position of the heads. The blocks are apertured for the inner ends 247 (Fig. 13) of the rods which are larger in section and ride in transverse channels 248 therein. Each of the blocks is mounted on a rod 249 slidably mounted in the disc and extending radially inward toward the center of the turret and has a tongue engaging bracket 250 which prevents them from turning. During the rest period between indexing movements of the turret, the blocks are moved radially outward from the disc center. At positions at which the jaws are to remain closed, an aperture 251 (Fig. 13) permits the head of the rod controlling that particular jaw to remain stationary, but at positions it is intended to open the jaws, the head of block 245 is solid and the push rod is moved by the operation of the said block. In this way each pair of jaws on the turret is opened and closed at each position as desired since the enlarged ends of the push rods pass from block to block as the turret indexes. The inner disc 246 is mounted on the tube 252 running through housing 38 and extending from a stationary part of the machine (not shown). The blocks 245 are moved by lever 253 on a pin in bracket 250 which engages a pin in the rod portion 249 thereof. The lever 253 is turned by longitudinal movement of collar 254 which is mounted on tube 256 and engages the roller 255 on a pin in the end of said lever. The tube runs through the housing 38 and is operated during the rest period of the turret by mechanism (not shown). Additional support is furnished for the inner end of tube 256 by the stud 257 located in a bushing therein which is fastened to a cover 258 attached to the inner disc 246 and which turns in ball bearing 259 in cover plate 40.

The outer turret jaws each comprise a stationary jaw 260 and a movable jaw 261 each having inserts 262 and 263 respectively which preferably are made of "Carboloy." The inserts are retained by screws (not shown) passing through apertures in the jaws and screwing into the backs of said inserts. Jaw 261 is mounted through a strip 264 of metal spring to jaw 260 which is mounted on shaft 265 pivotally supported by bracket 266. Jaw 260 is attached to the shaft by being clamped between block 267 and gear segment 268 which are drawn together by screws extending therebetween. Bracket 266 supports the entire side jaw assembly and is mounted on either ring 43 or 44 (Fig. 1) through bolt 269. The brackets are insulated from the rings by a strip of insulating material 270 therebetween and by an insulating washer 271 on the bolt. Each of the brackets 266 is accurately attached during assembly of the machine to the rings 43 and 44 at positions in which the jaws are located at twenty-four equidistantly placed positions thereabout and adjustment of all outer jaws with reference to the position of the middle jaws is made through movement of said rings. The rings are clamped onto the face of the turret by rings 45 and 46 which are screwed on threads in the turret 30 and engage rings 43 and 44 through washers 273 therebetween. Rings 44 and 45 are turned through the internal gear 274 attached thereto which is engaged by gear 275 on spindle 276. The spindle is provided with a hexagon head for easy engagement with a wrench and carries a rod 277 riding on spring 278 in an aperture therein which pulls gear 275 from engagement with the internal gear when said gear is not in use.

The outer turret jaw operating mechanism comprises lever 279 which pivots on its boss 280 located within an aperture in the bracket 281 extending from jaw 260 and connects to jaws 261 through link 282. The link 282 is attached to a cylindrical block 283 in lever 279 and a similar block 284 in jaw 261. The jaws are closed by a spring 285 extending between a pin in jaw 260 and lever 279 and are opened by the push rod 242 striking the lever through movement of said rod produced as already described. The particular push rod 242 operating this jaw is not shown but is held in the supporting standard 229 of the middle jaw following. So the jaws will remain in any position taken about pin 265 a friction production means operating from gear segment 268 is used. This means consists of a gear 286 which engages said segment and which is located between the friction producing fibre washers 287 and 288. The washers are pressed against the sides of the gear by spring 289 which is located below the head of screw 290 extending from arm 291 and forces cup 292 in which it is located against washer 288. The gear 286, the cup 292 and the friction washers 287 and 288 are loosely mounted on screw 290 and slide thereon as required to produce the necessary engagement between parts. Arm 291 is pivotally mounted on the pin 293 extending between arms of yoke 294 which is in turn attached to bracket 266 through bracket 295 which is clamped about a boss extending from said yoke. Gear 286 is made to engage gear segment 268 by arm 291 and the friction washers 287 and 288 which are turned to cause the engagement by lever 296. The lever 296 is located on pin 293 between the friction producing washers which lie between the arm 291 and washer 292 and are caused to move with the lever by the inward pressure of the legs of the yoke which draws them tightly together. Lever 296 is operated by a spring 298 located in an aperture in the boss of the yoke which is closed off by screw 299, and into which an end of the lever protrudes through another aperture in said boss. So the longer wires will not be bent or swing into the mechanism about the turret, a pair of fingers 298' (Fig. 1) which are adjustably supported in arm 299' are used. Arm 299' extends from bracket 295.

Now taking up the operation of the machine at positions 5 and 6 at which the odd and even heads respectively of the turret lie on being indexed from the first four positions previously described. In these positions two mechanisms, each located adjacent opposite faces of said turret, engage the outer turret jaws and swing them outward to a position clear of the middle jaws. Each mechanism, as shown in Fig. 14, comprises an arm 300 having fingers 301 and 302 extending therefrom which lie over the middle pairs of jaws as the turret is indexed. The arm 300 is clamped to an end of rod 303 which is pivotally attached to arm 304 through cranks 305 and 306. Rod 303 engages crank 305 through pin 307 and engages crank 306 through pin 308 and the collar 309 clamped to said rod. The cranks 305 and 306 are attached to arm 304 by ball bearings on screws 310 and 311 respectively. After the turret has come to rest, the fingers 301 and 302 are made to move outwardly therefrom and since they engage blocks 312 on the respective pairs of outer jaws cause the jaws to recede from the middle jaws. The turret jaw assembly turns about pin 265. The operation of the receding mechanism is brought about by the turning of crank 313 which is clamped onto the cylindrical portion of crank 306 and which is engaged by a rod 314 operated by mechanism not shown. Arm 304 is mounted in a bracket 315 (Fig. 2) extending from rod 49.

The next turret index places the even turret head in a position at which another operation takes place but another index occurs before the odd head rests in a similar position. Positions 7 and 10 are rest positions whereas positions 8 and 9 are operating positions at which the middle jaws of the even and odd heads are provided with the middle section of the leading-in wire manufactured. The wire is supplied to the machine in continuous strands on a pair of spools mounted side by side and feeding through duplicate mechanisms. One supply spool 316 is shown in Fig. 1 and the wire therefrom passes under sheave 317, over sheave 318 and through straighteners 319 and 320 to the feeding mechanism. Both spools are mounted on pin 321 between sections of bracket 322 and are revolved against the friction produced by fabric bands 323 rubbing thereagainst. The bands are attached to arm 324 extending from bracket 322 and are pulled against the spool by separate weights 325 which are hooked to the lower end thereof. As shown in Fig. 2, bracket 322 is mounted on rods 50 and 51. Sheaves 318 are mounted on pin 326 in bracket 322 and sheaves 317 are each mounted on a pin 327 in an arm 328 extending from a collar rotatably mounted on pin 326. Tension is kept in the wires by sheaves 317 which are pulled out of the direct path of the wire by springs 329 located between arms 328 and bracket 322. The wire straighteners 319 and 320 operate in planes at right angles to each other and are of the customary design having rollers alternately spaced on either side of the wire.

Both wires are fed by the feeding mechanism shown in Figs. 1, 15 and 16 which provides sheaves 330 and 331 about which the wires are wound for advancing the wire. Each incoming wire passes over tube 332 which is partially cut away to provide clearness therefor, between guide rollers 333 and 334 and then to the feeding sheaves. Rollers 333 and 334 are mounted on screws in the bracket 336 extending from housing 337 through which the shaft 338 connecting sheaves 330 and 331 is mounted on bearings therein. The housing 337 is attached to arm 339, (Fig. 1), extending from a stationary part of the machine. Before passing from the sheaves the wires pass under rollers 340 and 341 which, as shown in Fig. 16, are mounted on either end of a shaft 342. The shaft 342 is mounted on bearings 343 and 344 in carriage 345 which is supported on self-aligning bearing 346 and pin 347. Pin 347 is free to turn block 348 so that the movement allowed by bearing 346 permits equal engagement of rollers 340 and 341 with each of the sheaves. The force of the engagement is provided by spring 349 which is located in an aperture in housing 337 and which butts against screw 350 therein and block 348. Block 348 moves in ways cut in the plate 351 which is attached to the housing. Both rollers 340—341 and sheaves 330—331 are driven members, the former is driven from the worm gear 352 through gear 353 and the latter is driven from said worm gear through gear 354. The peripheral speed of the rollers and gears differ as the gearing is designed to drive the rollers faster so the wire on the sheave will be drawn tightly thereabout. This method of operation prevents slack in the wire about the sheaves and provides a very positive feed suitable for use at a high rate of speed. Worm gear 352 is mounted on an end of shaft 355 between collars 356 and 357 and extends through arm 339 to mechanism (not shown) which rotates said arm the required amount in proper time relation to operation of the machine.

When the wire is threaded between the sheaves and rollers, manually operated mechanism is used to lift the rolls from the sheaves and for turning the said sheaves. Each roll is lifted by a lever 358 which is turned about screw 359 in the housing 337 by the insertion of the thicker portion of cam 360 under an end thereof. In one instance cam 360 is fastened to a thumb wheel 361 which rides on pin 362 extending from the housing and in the other instance is supported on pin 363 which also supports bearing 346. The wheels tend to remain in one position because of the friction produced by spring 364 which lies between the wheel and the washer 365 which is either fastened to pin 362 or pin 363. Manual operation of the sheaves is produced through turning of wheel 366 (Fig. 1) which operates shaft 355 through shaft 367 and bevel gears 368 and 369. Knob 370 permits wheel 366 to be turned more easily. On leaving the periphery of the sheaves, each wire passes into a tube 332 supported by bracket 371 extending from housing 337 and hence between the rollers 372, 373 and 374 of the wire straightener and into tube 375. The straightening mechanism takes out the curvature placed in the wire by the feeding sheaves and comprises the stationary rollers 372 and 374 mounted on screws 376 and 377 in bracket 371 and the adjustable roller 373 mounted on screw 378 in slide 379 in ways in said bracket. Roller 373 is pushed against the wire by rotation of the barrel 380 of the micrometer 381 mounted in bracket 371 which engages the slide through rod 382. The washer assemblies 383 and 384 close off the opening in housing 337 about shaft 342.

Each of the seal wires leaving the feeding mechanisms passes through duplicate cutting mechanisms and the end of said wires fed therebeyond extends to a position between the jaws of a scraping mechanism. The mechanisms as shown in Fig. 1, lie above the turret and operate both while the turret is indexing and while it is at rest. One of the cutting mechanisms is shown in detail in Fig. 17, whereas the scraping mechanism, which takes care of both seal wires, is shown in Figs. 18 and 19. The scraping mechanism operates during the rotation of the turret at which time the feeding of the wire also takes place. The wire within each cutting mechanism is located within a groove (not shown) in guide block 385 and the longitudinal aperture in die 386 and when fed is pushed out beyond the face of said die. The extending end of the wire is then engaged by one pair of circular knives 387 and 388 which close thereon striking the wire on opposite sides very close (approximately 1/64 inch) to the end. The knives 387 and 388 are mounted on jaws 389 and 390 respectively which are pivotally mounted on pins 391 and 392 respectively in link 393 and are closed by movement of lever 394. The lever 394 is mounted on pin 395 extending from plate 396 and as turned carries the stud 397 from between the rollers 398 and 399 on pins in the jaws which permits the spring 400 to close them. The spring 400 is partially located within apertures in both the jaws and extends between posts in each. To prevent the jaws from cutting too deeply the closing movement is stopped when the end of screw 401 in jaw 389 strikes jaw 390. The forward ends of the jaws are supported in ways formed by bracket 402 extending from plate 396 and bar 403 which is attached to said bracket. The back ends of the jaws are supported through link 393 which is engaged by pins 404 and 405 of crank 406 and lever 407 respectively which pivot about pins 408 and 409 respectively extending from plate 396. Plate 396 is fastened to bracket 410 which extends from rods 50 and 51. Having gripped the wire, the knives are pulled off the end thereof leaving two oppositely disposed areas adjacent to the end scraped clean. The purpose of this operation is to remove a protective coating, usually borax, which is non-conductive, so that connection can be made to the wire for the welding thereof. This operation is brought about by the turning of lever 407 through longitudinal movement of rod 411 which is produced by the operating mechanism (not shown). The rod lies in passages in bracket 402 and in block 412 extending from plate 396 and causes both movements in the jaws. The closing movement is produced through operation of lever 394 which engages through pin 413 therein collars 414 and 415 which are attached to said rod. The scraping movement is produced through operation of lever 407 which engages through a pin 416 lying between the larger part 417 of the rod and collar 418 lying against spring 419. The spring 419 is contracted by the opening movement of the jaws as their forward position is set by the stud 420 which strikes link 393 and, as expanded on the return movement of the rod, permits the jaws to be closed before the scraping is produced. A portion of the operation linkage is shown in this instance in Figs. 1 and 2. The rod 411 is connected to rod 421 which is operated by the turning of lever 422 about a pin of bracket 423 and said lever is operated by rod 424 extending from crank 425. The crank 425 turns pin 46 in spider 55 and the said pin, through crank 427 attached thereto, is operated by longitudinal motion of rod 428 which connects to the operating mechanism located below the table 36. Means are provided for carrying away the material scraped from the wire so it does not fall into other portions of the machine. This means consists of a current of air drawn in holes 429 of the knives by the suction in pipe 430 which connects to the ends of the inner knives 388—388. Knives 387—387 have their ends closed off forcing the air to pass in the apertures therein, and knives 388—388 make a slip connection with the pipe 430 so the movement of the jaws is not interfered with. Pipe 430 connects through elbow 431 to a passage 432 in bracket 410 which leads to a source of the suction of air through passages in rod 50, the spider 55 and pipes (not shown) within housing 39, standard 34 and other parts of the machine.

After the wire scraping operation, the cutting mechanism (Figs. 1 and 17) moves, carrying the wire end protruding therefrom into the middle pair of turret jaws. The position taken by the wire is governed by apparatus associated with the scraping mechanism which comprises the discs 433 and 434 which come into engagement with the middle turret jaws as shown in Fig. 1 and limit the extent the wire may pass into the jaws. The discs are each mounted on an arm 435 which pivots on pin 436 in yoke 437 which is pivotally mounted on pin 438 in bracket 402. The discs swing into contact with the jaws when rod 411 completes its full movement to the right as collar 439 thereon no longer holds the arms 435 back through studs 440 and the springs 441 located between said arms and bracket 402 are free to swing the arms into position. Yokes 437 are provided so the position of the discs may be adjusted. This is done through rotation of the barrels of the micrometers 442 mounted on bracket 410 which through rod 443 press the free end of the yokes down against the lifting force of spring 444 which is fastened to bracket 402 and engages the other legs of said yokes.

The cutting mechanism in which the wire is held comprises a die 386 which has a square outer contour and is held rigidly in plate 445 and a guide block 385 which is clipped to said plate through springs 446 attached to said block. The plate 445 is mounted on arm 447 through the yoke 448, which engages the inner end of said plate through pin 449 and is pivotally fastened to said arm through screw 450, and through lever 451 which engages the forward end of the plate through pin 452 and is pivotally fastened thereto by screw 453. The end of lever 451 operates in a cutaway portion of the plate 445. The arm 447 is mounted on a stationary part of the machine through yoke 454 which is clamped thereto and through its legs and pins 455 therein engages the legs of yoke 456. Yoke 456 is mounted on the lower end of a rod 457 held by the bracket 458 (Fig. 1) which supports similar rods of both the cutting mechanisms and is supported by rods 50 and 51. The transferring motion of the mechanism carrying the wire into the turret jaws occurs as the assembly swings down through partial rotation about pins 455. This motion is produced by rod 459 which is attached through pin 460 to arm 447 and occurs as said rod is actuated (Fig. 1) from mechanism (not shown) through link 461 and rod 462. The depth to which the wire is carried into the jaws is controlled by the discs 433 and 434 and by the position of the mounting for link 461. The mounting comprises link 462' which is fastened to link 461 and to slide 463 and is adjusted by changing the position of said slide in bracket 464 through rotation of the barrel of micrometer 465. The micrometer is attached to bracket 464 which is mounted on rods 50 and 51. Block 466 holds the slide 463 in the ways of the bracket as it is fastened thereto through a screw 467 extending from said bracket to said block through a slot (not shown) in said slide. After the jaws of the turret head have closed on the wire held by the cutting mechanism, the plate 445 is moved so that the die 386 is carried across the knife 468 cutting the wire. The knife is held in a similarly shaped slot in the cylindrical plug 469 which lies in a hole in arm 447. The knife is held in position by being drawn tightly against the side of the groove in arm 447 in which it is located by the screw 470. The screw lies eccentrically in the end of the plug and engages the arm through the washer located thereabout. The cutting movement is produced by movement of lever 451 which is engaged by the slide block 471 eccentrically located in the end of shaft 472 which is turned from mechanism (not shown) through rod 473 and arm 474. The use of the side of the knife for cutting provides certain advantages since the cutting edge rests against the arm when in position and after being sharpened is bound to take exactly the same position. The mechanism is moved closer to the jaws or farther away therefrom by turning cam 475 which is mounted on pin 476 and is turned by manual rotation of block 477 and post 478. The cam 475 engages stud 479 of plate 445 and moves the plate against the pressure of spring 480 which is partially located in an aperture in the plate and which butts against stud 481 and said plate. The yoke 454 carries the stud 481. The adjustment is permitted since yoke 448 is fastened to arm 447 through a bearing 482 about screw 450 which is of the self-aligning type. Block 483 is fastened to the arm 447 and engages both legs of the yoke 448 so that it may not swing sidewards. The transverse position of the cutting mechanism with reference to the turret jaws can be adjusted by movement of arm 484 which swings the mechanism about shaft 457. Screws 486 and 487 lying in a lip of bracket 458 and arm 484 respectively are for making this adjustment and for clamping the mechanism in position.

The turret jaws are again indexed, now carrying the odd and even heads thereof into positions 11 and 12. While in these positions the shorter nickel wires are welded to the middle Dumet wire. The first step in this operation is the making of electrical connections to the wires in both middle and outside jaws 33 and 42 respectively. The connection is brought about by the connection mechanism in Figs. 20, 21 and 22 which contact the wire in the middle jaw and by brushes, one of which is shown in Fig. 24, which make contact to the outer jaws. A connection mechanism is provided for each of the heads and it comprises a pair of jaws 490 and 491 which have blocks 492 and 493 thereon for making connection with the wire when the jaws are closed. The blocks engage the cleaned portions on the end of the wire in the middle jaws which is opposite to the end at which the weld is to be made and are connected through flexible wires (not shown) to the source of the welding electricity. The jaws 490 and 491 are mounted eccentrically on gears 494 and 495 through screws 496 and 497 and on cranks 498 and 499 by screws 500 and 501. Operation of the jaws is provided by rod 502 which is connected to gear 494 through arm 503 thereof and is operated by mechanism (not shown). Both the gears 494 and 495 and cranks 498 and 499 are mounted on plate 504, the former through pins 505 and 506 and the latter through yoke 507 which is adjustably mounted in an aperture in said plate and carries a screw 508 extending between legs thereof on which the cranks are pivotally mounted. Plate 504 is pivotally mounted by screw 509 on the end of rod 510 extending from the bracket 511 (Fig. 2) which is mounted on rods 52 and 53 and held in correct alignment with the wire by mechanism in bracket 512 which is fastened to rod 510. The bracket 512 is made to hold one position on the rod by dowel pin 513 extending therebetween and fixes the position of plate 504 by engaging stud 514 therein as shown in Fig. 22. The stud is engaged by the pins 515 and 516 which are located in an aperture passing from side to side in bracket 512 and are engaged by slugs 517 and 518 below screws 519 and 520, the angularity of the contacting ends of the pins and slugs causing movement of the pins as the screws are turned in or out. The connection mechanism is insulated from the machine by an insulating sleeve and washers (not shown) between rod 510 and bracket 511.

Electrical connection is made to the outer jaws through the block 521 (Fig. 13) on pin 522 extending from bracket 266 which contacts through the turret rotation with brush 523 (Fig. 23) mounted adjacent to the welding position. The brush 523 is pivotally mounted on a pin 524 in bracket 525 which is carried in an insulating block 526 in collars 527 and 528. The end of the brush is mounted on spring 529 which is partially located in an aperture therein and is electrically connected to bracket 525 by the flexible wire 530 soldered to each. The collars 527 and 528 are mounted on housing 38 and correspond to similar ones on housing 39 with a brush thereof indicated in dotted lines in Fig. 1 at an incorrect position. The electrical connection mechanism to both the outer jaw pairs of the odd and even heads is not exactly duplicated as in one instance the brushes 523 are located farther from the side of the turret than in the other and a correspondingly longer pin 522 is provided one pair of jaws so that it engages the said brush. This construction keeps the electrical systems separate at all times.

Before the outer pair of turret jaws are moved so as to bring the ends of the wires into contact to make the weld the friction mechanism retarding movement of the jaws is released. The rotation of the turret also causes this action since roller 531 (Fig. 13) on pin 532 extending from lever 296 engages a cam (not shown) on collar 527. Such a cam 533 is indicated in dotted lines in Fig. 1 at an incorrect position and is mounted on an insulating insert 534 in an arm of said collar. The cam tips the gear 286 out of engagement with gear segment 268 by turning lever 296 against the pressure of spring 298.

The outer pair of jaws are moved so the ends of the Dumet and nickel wire butt against each other making a weld, by the jaw pushing mechanism shown in Figs. 24, 25, and 26. As with all other mechanism operating in connection with the turret heads at these turret positions, duplicated mechanisms are provided for each head. The jaw pushing mechanism, as shown in the drawings, is partly through with its operation cycle and as first operated brings the head 535 against the block 312 of the turret jaws. The head 535 is mounted on rod 536 extending from piston 537 which is located in arm 538 and is supported by said arm through links 539 on either side thereof on pins in the arm and head. The arm 538 is clamped about a stud of connection block 540 which is insulated therefrom by sleeve 541. The block is pivotally attached to arm 542 and is connected to crank 543 by tube 544. As the plunger is carried into contact with the head, the crank 543 and arm 542 swing about pin 546 and stud 545 respectively extending from arm 547 which is supported by an arm of bracket 548 (Fig. 2) extending from rod 52. Another arm of said bracket holds the similar mechanism located adjacent the other jaw set. Operation of the plunger is produced by cam mechanism (not shown) through rod 549 which is attached to lever 550 which in turn is clamped about a portion of crank 543. Shortly after engaging the jaw, finger 551 is brought down on the opposite side of block 312 of the turret jaws which leaves the block clamped between the plunger and finger making motion of such jaws absolutely dependent on the mechanism. Finger 551 is mounted on the end of arm 552 which is pivotally attached to arm 538 of the plunger and is moved with respect thereto by pin 553 in said arm which engages ways of track 554. The track is mounted on arm 555 which is clamped about a stud (not shown) protruding from hub 556 from which it is insulated by a sleeve 557. As the finger comes into position, the track is lowered by the turning of hub 556 which is produced by arm 558 extending therefrom as the shoe 559 held thereby comes onto the high part of cam 560. The hub is pivoted on pin 561 in lever 562 extending from arm 547 whereas cam 560 is fastened by screws 563 to a portion of crank 543 and the said shoe 559 is pivoted on pin 564, in arm 558. The shoe is kept from turning by the upper end which bears against said arm. As the plunger pushes the outer jaws nearer the middle jaws, pin 553 slides in the ways of track 554 and all mechanism remains in the same relation until the wires held therein are nearly touching. At such time the finger 551 is raised by the track moving upward corresponding to the downward movement of shoe 559 as it reaches the low part of cam 560. At this moment lever 565 which is pivotally attached to arm 538 by screw 566 comes in contact with pin 567 in lever 568. The continuing movement of the arm 538 causes the head 539 to move independently thereof as pin 567 causes lever 565 to turn operating piston 537 to which it is connected through pin 569 extending through an aperture in arm 538. This motion brings the ends of the wires held in the jaws together causing the weld to be made and is featured by means for controlling the pressure exerted by the plunger. Pin 567 is attached to arm 568 through washers and a bushing (not shown) which insulates it electrically therefrom and remains stationary until the pull exceeds that produced by springs 570 and 571 which are connected thereto through links 572 and 573. Excessive pull against the pin causes arm 568 to turn about pin 574 in bracket 575 and causes lever 565 to turn so the plunger head remains stationary and the movement of the arm 538 takes up some of the space therebetween. In this way the excessive movement of the plunger occurring before arm 542 strikes stop screw 576 in arm 577 is taken up and is not harmful. The force with which the springs pull on said arm is controlled by knob 578 on which a cord 579 connected to spring 571 is wound and is changed by winding or unwinding cord therefrom. In this way the tension of the springs is changed. Means are provided for indicating the tension by pointer 580 and dial 581, the former of which is fastened to link 573 through arm 582 and is caused to turn as said arm is turned about pin 583. Bracket 584 supports pin 583, dial 581, knob 578, bracket 575, arm 577 and is supported by stud 545 and stud 585 extending from arm 547. Having caused the weld, this mechanism is returned to its former position by movement of rod 549 to the left. Arm 568 then swings back against stop screw 586 in bracket 575 and lever 565 engages pin 587 in bracket 584 which swings it back to its former position, drawing the head 535 against the end of arm 538. As shoe 559 travels back along the face of cam 560 the high part thereof turns the shoe about pin 564 against the pull of spring 588 which returns it to position after said part is passed. The spring lies in an aperture in arm 558 and extends between a pin therein and the top end of said shoe. With the return of this mechanism, the return of the contact making jaws also takes place.

The turret index now taking place moves the turret jaws followed by this description to positions 13 and 14 where the copper wires are welded to the other end of the seal wire (see Figs. 3 and 4). In these positions the two parts of the leading-in wire already completed is connected to the electrical welding circuit through the outer jaws carrying the nickel wire which engages similar brushes to that shown in Fig. 23 adjacent to these positions. Electrical connection is made to the jaws 41 holding the copper wire through similar mechanism, the brushes 523 thereof being mounted on collars 589 and 590. In addition to these operations the friction mechanism controlling the sideward movement of the jaws is released. As in the other instance, a cam (not shown) similar to cam 533 engages roller 531 of the jaw through the turret index pulling gear 286 from engagement with gear segment 268. The weld occurs as mechanisms which are duplications of that shown in Figs. 24, 25, and 26 used in the former instance pushes the jaws until the wire ends come together. These mechanisms are mounted on bracket 591 which extends from rod 53.

No other operations take place during the indexing of the heads until they come into positions 20 and 21. At these positions the jaws are opened and the leading-in wire is allowed to drop out. The heads then index through positions 22, 23 and 24 and start on another rotation duplicating the operation described.

The electrical circuit used in welding the wires together is shown in Fig. 27 and consists of four duplicate circuits connected to one source of electricity through wires 592 and 593. Included in these circuits is a switch shown in Figs. 1, 2 and 28 having a disc 594 of insulating material on which four blocks 596 are mounted. As shown on the diagram, the blocks are connected through resistances 597 to one lead from condensers 598. The blocks are mounted in bushings 599 in the disc which is preferably made of "Bakelite" and which is mounted on tube 600. The whole is supported by the tube which is mounted on ball bearings 601 and 602 in bracket 603 and is rocked a few degrees counter-clockwise and then clockwise with each turret index by lever 604. The lever is actuated by cam mechanism (not shown) operating through rod 605. As the disc 594 is turned counter-clockwise, blocks 596 engage blocks 606 which are each connected through a resistance 607 to line wire 592 thereby charging condensers 598 which are also connected by wire 608 to line wire 593. In this particular instance resistances 607 each comprise four 150 ohm, 150 watt resistances, connected in parallel, resistances 597 each are of 72 ohms, 150 watts, and condensers 598 each consist of fourteen 1 Mfd. condensers. As the disc 594 turns clockwise, block 609 is contacted by block 596 which is connected to one section of the leading-in wire. Blocks 606 and 609 are in each case mounted on levers 610 and 611 respectively which are supported on pins 612 and 613 extending from plate 614 and have their outer ends connected by springs 615. Plate 614 is made from an insulating material such as Bakelite and springs 615 are connected to the levers through links 616 also of an insulating material so the levers are entirely insulated from each other.

At positions 11 and 12, as indicated in Figs. 1, 2 and 27, wires 617 and 618 pass from blocks 609 through housing 39, passages (not shown) in spider 55 and rod 52 to the contacting jaws supported thereby. At these same positions wires 619 and 620 passing from the condensers 598 come up through standard 35, pass through housing 38 to the brushes (not shown) mounted adjacent to these positions on collars 527 and 528. At positions 13 and 14 the remaining two of blocks 609 are connected by wires 621 and 622 to the brushes located adjacent to these positions on collars 589 and 590. The condensers are connected by wires 623 and 624 to brushes opposite these positions on collars 527 and 528.

What I claim as new and desire to secure by Letters Patent of the United States is:

1. A machine for welding pairs of wires together in end to end relation comprising a turret, a plurality of pairs of jaws mounted at the periphery thereof, each adapted to hold one of said wires, a ring adjustable by rotation mounted on one face of said turret adjacent the periphery thereof, a plurality of pairs of jaws mounted on said ring, each adapted to hold the other of the wires of a pair spaced from the said first-mentioned wire, means for connecting each of said wires to a source of electricity and means for moving said pairs of jaws to cause the ends of the wires to meet and so to become welded together.

2. A machine comprising a rotatable turret, a plurality of pairs of jaws spaced apart equidistantly at the periphery thereof, a plurality of rods each controlling the operation of a pair of said jaws and extending radially toward the center of said turret, a stationary supporting disc located substantially centrally of said turret, a plurality of blocks mounted slidably in said supporting disc and adapted to engage the ends of said rods, means for moving said blocks radially of said turret to actuate said rods and means whereby said parts are caused to operate in proper time relation.

3. A machine for welding together in end to end relation a pair of wires, one of which is coated, comprising a pair of jaws adapted to hold a wire, another pair of jaws mounted adjacent thereto and adapted to hold a wire spaced from the other wire, means for scraping a portion of said coated wire, means for then connecting the wires in an electric circuit, said means engaging the bare portion of the scraped wire, and means for then shifting one pair of jaws so that the ends of the wires meet and are welded together.

4. A machine for welding together in end to end relation a pair of wires, one of which is coated, comprising a pair of jaws adapted to hold a wire, another pair of jaws mounted adjacent thereto and adapted to hold a wire spaced from the other wire, means for scraping a portion of said coated wire comprising a pair of opposed knives, a pair of jaws on which said knives are mounted, means for closing said pair of jaws causing the knives to engage the wire and means for moving the pairs of jaws so that the knives are pulled off the end of the wire removing the coating therefrom, means for then connecting the wires in an electrical circuit, said means comprising a pair of jaws engaging the bare portion of the scraped wire, and means for then shifting one pair of jaws so that the ends of the wires meet and are welded together.

5. A machine for welding a pair of lengths of wire together in end to end relation comprising a stationary pair of jaws adapted to hold a length of wire, another movable pair of jaws pivotally mounted adjacent thereto adapted to hold the other length of said pair of wires in alignment with the first-mentioned wire, means located adjacent to the pivoted jaws for feeding a length of wire thereinto, mechanism for swinging the pivoted pair of jaws away from the stationary pair of jaws, means for feeding a length of wire into the stationary pair of jaws, means for connecting the wires to a source of electricity and means for swinging the pair of jaws so that the ends of the wires meet and are welded together.

6. A machine for welding a pair of lengths of wire together in end to end relation comprising a pair of movably mounted jaws adapted to hold a length of wire, a pair of stationary jaws mounted adjacent thereto adapted to hold the other length of wire of said pair in alignment with the first-mentioned length, means located adjacent to the movable jaws for feeding a wire, means for cutting a length of wire therefrom, means for transferring said length into the movable pair of jaws, means for moving said pair of jaws away from the stationary pair of jaws, means located adjacent to the stationary pair of jaws for feeding a wire thereinto, means for severing that portion of the wire in said pair of jaws from said wire, means for connecting a source of electricity to the lengths of wire and means for shifting the movable pair of jaws so that the ends of the wires meet and are welded together.

7. A machine for welding together in end to end relation a pair of lengths of wire, one of which is coated, comprising a pair of movably mounted jaws adapted to hold a length of wire, a pair of stationary jaws mounted adjacent thereto adapted to hold the other wire length in alignment with the first-mentioned length, means located adjacent to the movable pair of jaws for feeding a wire, means for cutting a length from said wire, means for transferring said length into the movable pair of jaws, means for moving said pair of jaws away from the stationary pair of jaws, means located adjacent to the stationary pair of jaws for feeding a coated wire, means for scraping the coating from a section of said wire, means for transferring a portion of said wire including the scraped section into the stationary pair of jaws, means for severing said portion from the said wire, means for connecting the lengths of wire in the pairs of jaws in an electrical circuit, said means comprising a pair of jaws engaging the bare portion of the coated wire in the stationary jaws, and means for shifting the movable pair of jaws so that the ends of the wires meet and are welded together.

8. A machine for welding together in end to end relation three lengths of wire, comprising a stationary middle pair of jaws adapted to hold a length of wire, two movable pairs of outer jaws each of which is located to one side of said first-mentioned jaws and is adapted to hold a length of wire in alignment with a length in the stationary pair of jaws, means located adjacent to said outer pair of jaws for feeding a wire, means for severing a length therefrom, means for transferring said wire length into one of said outer pair of jaws, means for feeding and depositing another length of wire similarly into the other of said outer pairs of jaws, means for moving both outer pairs of jaws away from the stationary pair of jaws, means located adjacent to said stationary pair of jaws for feeding a wire, means for transferring said wire into the middle stationary pair of jaws, means for severing that portion held by said pair of jaws from said wire, means for connecting the length of wire in the stationary pair of jaws in an electrical circuit, means for connecting the length of wire held in one pair of the movable pairs of jaws in said circuit, means for shifting said movable pairs of jaws holding said outer length of wire so that its end engages an end of the wire in the stationary pair of jaws and is welded thereto, and means for making electrical connection and shifting the other outer length into position to cause a welding of its end to that of said middle length.

9. A machine for uniting three lengths of wire together in end to end relation which comprises a turret mounted on a horizontal axis, a plurality of heads located at the periphery of the turret and comprised of three pairs of jaws, the middle pair of which is mounted on the turret and is adapted to hold the middle length of wire and the other two outer pairs of jaws of which are each mounted pivotally on the turret to one side of the middle pair of jaws and is adapted to hold an end length of wire in alignment with the middle length, wire severing means disposed adjacent to one position of an outer pair of jaws, means for feeding wire through said severing means, means for supporting that portion of wire advanced beyond the severing means and, after operation of the severing means, for transferring the length severed to an outer pair of jaws so that the severed end of said length is closest to the middle pair of jaws, duplicate feeding, severing and transferring means for depositing a length of wire similarly in the other of said outer pairs of jaws, means for temporarily swinging each of the outer pairs of jaws away from the middle pair of jaws, wire severing means disposed adjacent to one position of the middle pair of jaws, means for feeding wire horizontally through said severing means, means for moving said severing means so that the portion of wire protruding therefrom is placed within the middle pair of jaws and for then operating said severing means, means for connecting the middle length of wire in an electrical circuit, means for connecting one of the outer lengths of wire in said circuit, means for swinging the pair of jaws holding said outer length of wire so that its end engages an end of the middle length of wire and is welded thereto and means for making electrical connection and swinging the other outer length into position to cause a welding of its end to that of said middle length.

10. A machine comprising a rotatable turret, a plurality of pairs of jaws located at each of a plurality of positions at the periphery of said turret, a plurality of rods corresponding to said pairs of jaws and each having its outer end adjacent a pair of said jaws, said rods extending radially inward toward the center of said turret, a stationary supporting disc located substantially centrally of said turret, a plurality of blocks radially slidable in said disc, said blocks having transverse channels therein adapted to engage the inner ends of said rods, certain of said blocks having in addition apertures therethrough in alignment with certain of the rods engaged thereby, and means for moving said blocks radially outward whereby the rods engaged by the portions of the said blocks having the channels only therein are moved radially outward to open the pairs of jaws adjacent their outer ends while the rods engaged by the portions of the blocks having in addition the said apertures are not moved by said blocks so that the pairs of jaws adjacent their outer ends remain closed.

11. A machine comprising a rotatable turret, a plurality of pairs of jaws located at each of a plurality of positions at the periphery of said turret, a plurality of rods corresponding to said pairs of jaws and each having its outer end adjacent a pair of said jaws, said rods extending radially inward toward the center of said turret, a stationary supporting disc located substantially centrally of said turret, a plurality of blocks radially slidable in said disc, said blocks having transverse channels therein adapted to engage the inner ends of said rods, certain of said blocks having in addition apertures therethrough in alignment with certain of the rods engaged thereby, and means for moving said blocks radially outward comprising a collar mounted so as to slide axially of said turret, a plurality of levers pivotally mounted in said turret and each having one end engaging said collar and the other end engaging an extension on one of said blocks, and means for moving said collar axially of said turret to cause said levers to be pivoted and move the said blocks radially outward whereby the rods engaged by the portions of said blocks having the channels only therein are moved radially outward to open the pairs of jaws adjacent their outer ends while the rods engaged by the portions of the blocks having in addition the said apertures are not moved by said blocks so that the pairs of jaws adjacent their outer ends remain closed.

12. A machine comprising a rotatable turret, a plurality of pairs of jaws spaced apart equidistantly at the periphery thereof, a plurality of rods each controlling the operation of a pair of said jaws and extending radially toward the center of said turret, a stationary supporting disc located substantially centrally of said turret, a plurality of blocks mounted slidably in said supporting disc and adapted to engage the ends of said rods, means for moving said blocks radially of said turret comprising a collar mounted so as to slide axially of said turret, a plurality of levers pivotally mounted in said turret and each having one end engaging said collar and the other end engaging an extension on one of said blocks, and means for moving said collar axially of said turret to cause said levers to be pivoted and move the said blocks radially outward to actuate said rods and means whereby said parts are caused to operate in proper time relation.

13. A machine for welding a pair of lengths of wire together in end to end relation comprising a turret, means for indexing said turret, a plurality of pairs of jaws located at each of a plurality of positions at the periphery of said turret and adapted to hold a pair of lengths of wire in longitudinal alignment, one of said pairs of jaws being movably mounted with respect to the other, means located adjacent to the path of travel of said movable jaws for feeding a length of wire thereto, means for moving said pair of jaws away from the stationary pair of jaws at a subsequent indexing position of the turret, means located adjacent to the path of movement of the stationary pair of jaws for feeding a length of wire thereto, means for connecting the lengths of wire to a source of electricity, and means for shifting the movable pair of jaws upon indexing of said turret to another position so that the ends of the wires meet and are welded together.

14. A machine for welding a pair of wires together in end to end relation comprising a turret, means for indexing said turret, a plurality of pairs of jaws located at each of a plurality of positions at the periphery of said turret, said jaws extending substantially radially outward from said turret, one of the pair of jaws at each position being pivotally mounted, said pairs of jaws being adapted to hold a pair of wires in longitudinal alignment, means for successively connecting said wires in an electrical circuit upon rotation of said turret and means for successively actuating said pivotally mounted jaws upon further rotation of said turret so that an end of the wire held thereby engages an end of the other wire thus causing said wires to be welded together.

15. A machine for welding three wires together in end to end relation comprising a turret, means for indexing said turret, three pairs of jaws located at each of a plurality of positions at the periphery of said turret, said jaws extending substantially radially outward from said turret, the outer pairs of jaws being pivotally mounted with respect to the middle pair and being adapted to hold wires in longitudinal alignment with a wire in the said middle pair of jaws, means for successively connecting said middle wire and each of said outer wires in an electrical circuit and means for successively pivoting said outer pairs of jaws so that ends of the wires held thereby engage the ends of the middle wire and are thus welded together.

16. A machine for welding three wires together in end to end relation comprising a turret, means for indexing said turret, three pairs of jaws located at each of a plurality of positions at the periphery of said turret, said jaws extending substantially radially outward from said turret, the outer pairs of jaws being pivotally mounted with respect to the middle pair and being adapted to hold wires in longitudinal alignment with a wire in the said middle pair of jaws, wire feeders disposed adjacent the paths of travel of said outer pairs of jaws for feeding lengths of wire thereto, means for pivoting said outer pairs of jaws away from said middle pair of jaws, a wire feeder disposed adjacent the path of travel of said middle pair of jaws for feeding a length of wire thereto, means for successively connecting said middle wire and each of said outer wires in an electrical circuit and means for successively pivoting said outer pairs of jaws so that ends of the wires held thereby engage the ends of the middle wire and are thus welded together.

CLEVELAND H. QUACKENBUSH.

CERTIFICATE OF CORRECTION.

Patent No. 2,137,181. November 15, 1938.

CLEVELAND H. QUACKENBUSH.

It is hereby certified that error appears in the printed specification of the above numbered patent requiring correction as follows: Page 3, second column, line 11, after the word "pivotally" insert mounted; page 6, first column, line 14, for the reference numeral "292" read 297; and second column, line 22, for "clearness" read clearance: page 7, second column, line 20, for "pin 46" read pin 426; and line 62, for "vokes" read yokes; page 11, second column, line 26, claim 10, after "turret" strike out the period and insert instead a comma; and that the said Letters Patent should be read with this correction therein that the same may conform to the record of the case in the Patent Office.

Signed and sealed this 27th day of December, A. D. 1938.

Henry Van Arsdale (Seal)

Acting Commissioner of Patents.